(12) United States Patent
Castillo et al.

(10) Patent No.: US 7,469,287 B1
(45) Date of Patent: Dec. 23, 2008

(54) APPARATUS AND METHOD FOR MONITORING OBJECTS IN A NETWORK AND AUTOMATICALLY VALIDATING EVENTS RELATING TO THE OBJECTS

(75) Inventors: Luis A. Castillo, Orlando, FL (US); Paul D. Mahaffey, Jr., Orlando, FL (US); Jeff P. Bascle, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 858 days.

(21) Appl. No.: 10/715,233

(22) Filed: Nov. 17, 2003

(51) Int. Cl.
*G06F 15/173* (2006.01)
*G06F 11/00* (2006.01)

(52) U.S. Cl. .............................. 709/224; 714/49; 714/57
(58) Field of Classification Search ................... 714/49, 714/57; 709/224
See application file for complete search history.

(56) References Cited

U.S. PATENT DOCUMENTS

| | | | |
|---|---|---|---|
| 5,159,685 A | 10/1992 | Kung | |
| 5,321,837 A * | 6/1994 | Daniel et al. | ................... 707/4 |
| 5,664,093 A | 9/1997 | Barnett et al. | |
| 5,699,502 A | 12/1997 | Swanberg et al. | |
| 5,777,549 A | 7/1998 | Arrowsmith et al. | |
| 5,872,931 A * | 2/1999 | Chivaluri | ..................... 709/224 |
| 6,124,790 A * | 9/2000 | Golov et al. | ................. 340/508 |
| 6,230,198 B1 | 5/2001 | Dawson et al. | |
| 6,255,943 B1 | 7/2001 | Lewis et al. | |
| 6,356,885 B2 | 3/2002 | Ross et al. | |
| 6,384,848 B1 * | 5/2002 | Kojima et al. | ............... 715/808 |
| 6,401,119 B1 | 6/2002 | Fuss et al. | |
| 6,446,134 B1 | 9/2002 | Nakamura | |
| 6,477,667 B1 | 11/2002 | Levi et al. | |
| 2002/0138638 A1 * | 9/2002 | Hermann et al. | ............ 709/230 |

FOREIGN PATENT DOCUMENTS

WO   WO0186444   * 11/2001

* cited by examiner

*Primary Examiner*—Joseph E Avellino
*Assistant Examiner*—Michael E Keefer
(74) *Attorney, Agent, or Firm*—Christine Q. McLeod; Beusse Wolter Sanks Mora & Maire, P.A.

(57) ABSTRACT

A method, apparatus, and program for monitoring an object of a system and validating the status of the object are provided. The invention can be implemented in numerous ways, including as a system (including a computer processing system), a method (including a computerized method), an apparatus, a computer readable medium, a computer program product, or a data structure tangibly fixed in a computer readable memory. Specifically, the invention provides methods and code devices for automated event processing to validate the status of an event of a monitored object in a network without manual operator intervention, including validation and remediation features based on event class.

16 Claims, 5 Drawing Sheets

APPARATUS AND METHOD FOR MONITORING OBJECTS IN A NETWORK AND AUTOMATICALLY VALIDATING EVENTS RELATING TO THE OBJECTS

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

TECHNICAL FIELD

The present invention relates to network monitoring. More specifically, the invention relates to method, apparatus, and program for monitoring an object in a network and validating the status of the object.

BACKGROUND ART

With the continued focus on reducing Information Technology (IT) support costs, distributed computing environments need to develop a method to efficiently monitor and manage IT assets so that labor costs can be reduced. However, monitoring performance and conducting system management of distributed computing environments has become more labor intensive because of the larger number of users, geographically diverse sources of data, and other items that have made system management more complicated and labor intensive. The systems to be monitored by IT personnel often include complex computer networks that may include numerous mainframes, minicomputers, workstations, etc.

Traditionally, computer implemented network management systems have concentrated on providing a set of fault isolation and test functions that allow a human operator to locate, diagnose and isolate network problems. Network problems are often expressed by the target network devices or "objects" in the form of alarms or other error messages. Alarms can generally be considered "events" reported by target network devices when abnormal conditions exist. In some networks, alarms are generated autonomously while in others the alarms are actually responses to queries (polls) (both will be referred to as alarms for purposes herein). Upon receiving the alarms from the network, the network management system displays the alarms on the operator's console (such as Tivoli® Enterprise Console). One of the operator's responsibilities is to interpret the alarm and then isolate and resolve the problem associated with the alarm in the shortest time span. The operator then uses a series of test procedures to determine the exact cause of the problem. Once found, he may take remedial actions and then move on to the next alarm. Obviously, alarm/event processing includes labor-intensive action. When events are presented to operators at a console, operators respond to those events by manually validating the events and creating incident records, and help-desk personnel convert these records into problem tickets. The problem tickets are then dispatched to the responsible entity for remedial action.

In a specific example, a network management system (NMS) displays a detected event (alarm) at an operations console, and then the operator or end system administrator manually validates that event. Event validation is a general requirement because the amount of "noise" or false alerts generated by an enterprise scale NMS systems. When performing large-scale monitoring, "false positive" detections can be caused by transient network anomalies or reporting inconsistencies. Therefore, diagnosing faults, including validating events, using manual management is time consuming and requires intimate knowledge of the distributed system.

To some extent this noise can be reduced with monitoring threshold tuning, but such timing is not enough to ensure higher levels of noise reduction. Manual process event validation has been problematic. Between different human operators, the speed of event validation and the accuracy of event validation can vary widely. In periods of peak activity, a less efficient operator can experience an event log back-up, and unneeded delays are introduced into the event processing stream. These delays result in an incremental increase in the mean time to restore a faulty system. In addition to introducing such delays, the interpretation of events and event triage data can vary between operations personnel. One operator may be more knowledgeable about an event type, and perform a more exhaustive manual validation process. This introduces inconsistencies in how events are processed, and impacts service delivery.

A number of patents and published applications exist which relate to systems management and event monitoring including, U.S. Pat. Nos. 5,159,685; 5,664,093; 5,699,502; 5,777,549; 6,230,198; 6,255,943; 6,356,885; 6,401,119; 6,446,134; 6,477,667. These systems do not show or suggest features that would eliminate manual operator intervention for validation of the status of events (alarms and objects).

Accordingly, there is a need in the art for improvements in event monitoring for system management that eliminates the need for manual intervention. It can also be seen, then, that there is a need in the art for a way to reduce the display of false positives or notifications for transient events on an operator's console. The present invention is designed to address these needs.

SUMMARY OF THE INVENTION

Broadly speaking, the invention provides a method, apparatus, and program for monitoring an object of a system in a network and automatically validating the status of the object (i.e., automatically validating of received alarms about the object), thereby reducing display of "false positives" and notifications of transient events on an operator's console, ultimately reducing labor costs. Validated events are transferred automatically to remedy tracking software, and event notification takes place within a shorter period of time, generally within seconds.

The invention can be implemented in numerous ways, by means of a system (including a computer processing system), a method (including a computerized method), an apparatus (including a computer readable medium, a computer program product, a graphical user interface, or a data structure tangibly fixed in a computer readable memory). Several embodiments of the invention are discussed below.

As a method, an embodiment of the invention includes a method of automated validation of an event of a monitored object in a network to determine valid and invalid events (e.g., invalid events include but are not limited to false positive events, transient system events, secondary events, event caused by noise, and the like), including: (a) receiving an event having event details, wherein the event details include event class; (b) performing automated validation of the event based on event class and ending automated validation for an invalid event (and continuing for valid events); (c) performing remediation of a valid event selected for remediation (e.g., events having remediation processes may be selected for remediation and those not having remediation processes are not selected for remediation, or only selected remediation processes may be utilized), and then performing automated validation of the valid event based on event class and ending automated validation for invalid event; and (d) automatically dispatching a problem ticket for the valid event.

The method may also include automated event processing to validate the status of an event of a monitored object in a network, including: (a) receiving an event having event details, wherein the event details include event class; (b) performing event validation on the event based on event class and assigning an event status as true or false based on the event validation; (c) if the event status is false, exit the processing; (d) if the event status is true and if remediation exists for the event, perform remediation and re-validate the event and assign the event status as true or false based on the event validation; (e) if the event status is false, exit the processing; (f) if the event status is true and if no operator intervention is required for the event, automatically dispatching problem ticket for the event.

The method also includes the step of determining whether the event class qualifies for automated event processing so that if it does not qualify the process is exited. To determine whether the event class qualifies for automated event processing, the event class is compared with a predetermined list of event classes that qualify for automated event processing.

The method also includes determining if the event is associated with a device in maintenance prior to performing event validation. If the device is associated with a device in maintenance, the processing is exited. In performing event validation on the event based on event class, a specific method for validating an event corresponding to the event class is invoked, so that the same method is invoked for every event of the event class, providing uniformity in event processing. The specific method executes a validation task and analyzes the return code to determine event status. The events are either valid or invalid events. The validation designates false positive events as invalid (and assigns an event status of false thereto); it designates transient system events as invalid (and assigns an event status of false thereto); and it designates secondary events as invalid (and assigns an event status of false thereto). If the event is not a transient system event, false positive event, or secondary event, then the event is considered valid and an event status of true may be assigned thereto (indicating a valid event).

The method also includes the step of creating an event record descriptive of the event prior to performing event validation. That event record is updated based on the results of the various validation and remediation steps performed during the process and provides information for problem tickets and the like. For example, the event record is updated with the event status (valid or invalid) after performing event validation or performing remediation and re-validating the event status. The event record is updated with results of the automated event processing prior exiting. This allows appending information indicative of results of the automated validation to a problem ticket. The information preferably includes a variable having a value assigned indicating one of a plurality of results which could correspond to one of (a) no problem found and event not validated; (b) problem found and will go on with problem ticket if required; (c) problem found but was fixed by automated tasks; (d) task failed to execute, however the problem may still be valid and will go on with problem ticket if required; (e) task failed to execute and an unknown anomaly was found and a ticket will be created; and (f) event correlated and this event should not be forwarded due to possible correlation. The information also includes path information to the file that contains the results.

In this method, the event validation serves as a filter for false positive events, transient system events, and secondary events. Event validation is performed on the event based on event class by a dynamically loaded script dependent on the event class. A default script is set for any event that does not have a specific script for the event class.

If after processing operator intervention is still required, the method generates the necessary operator notification information. The operator notification information is extracted from a database and is converted into a problem ticket if the event is not resolved.

In a more specific embodiment, the method of automated event processing to validate the status of an event of a monitored object in a network without manual operator intervention as part of an event dispatch process, includes: (a) receiving an event having event details, wherein the event details include event class; (b) if the event class qualifies for automated event processing, initiating automated event processing for the event, otherwise skip to step (j); (c) if the event is not associated with a device in maintenance, creating an event record descriptive of the event, otherwise skip to step (j); (d) performing event validation on the event based on event class and assigning event status as either true or false based on validation; (e) updating the event record with the event status; (f) if the event status is false, skip to step (j); (g) if remediation exists for the event, perform remediation (of those selected events where remediation is available) and re-validate the event and assign event status as either true or false based on validation; (h) if the event status is false, skip to step (j); (i) if no operator intervention is required for the event, dispatching problem ticket for the event; and (j) exiting automated event processing.

The invention also includes a system for automated event processing to validate the status of an event of a monitored object in a network (without manual operator intervention), that includes a network communication channel; at least one server connected to the network communication channel; a notification means for forwarding an event of a monitored object to the server; an automated event processor for validating the status of the event, wherein the automated event processor comprises computer code devices for performing event validation on the event received from the notification means based on an event class and assigning an event status as true or false based on the event validation and if remediation exists for the event, perform remediation and re-validate the event and assign the event status as true or false based on the event validation, and if the event status is true and if no operator intervention is required for the event, automatically dispatching problem ticket for the event.

The invention also includes computer program product recorded on computer readable medium for automated event processing to validate the status of an event of a monitored object in a network without manual operator intervention comprising computer code devices for the methods of the present invention.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
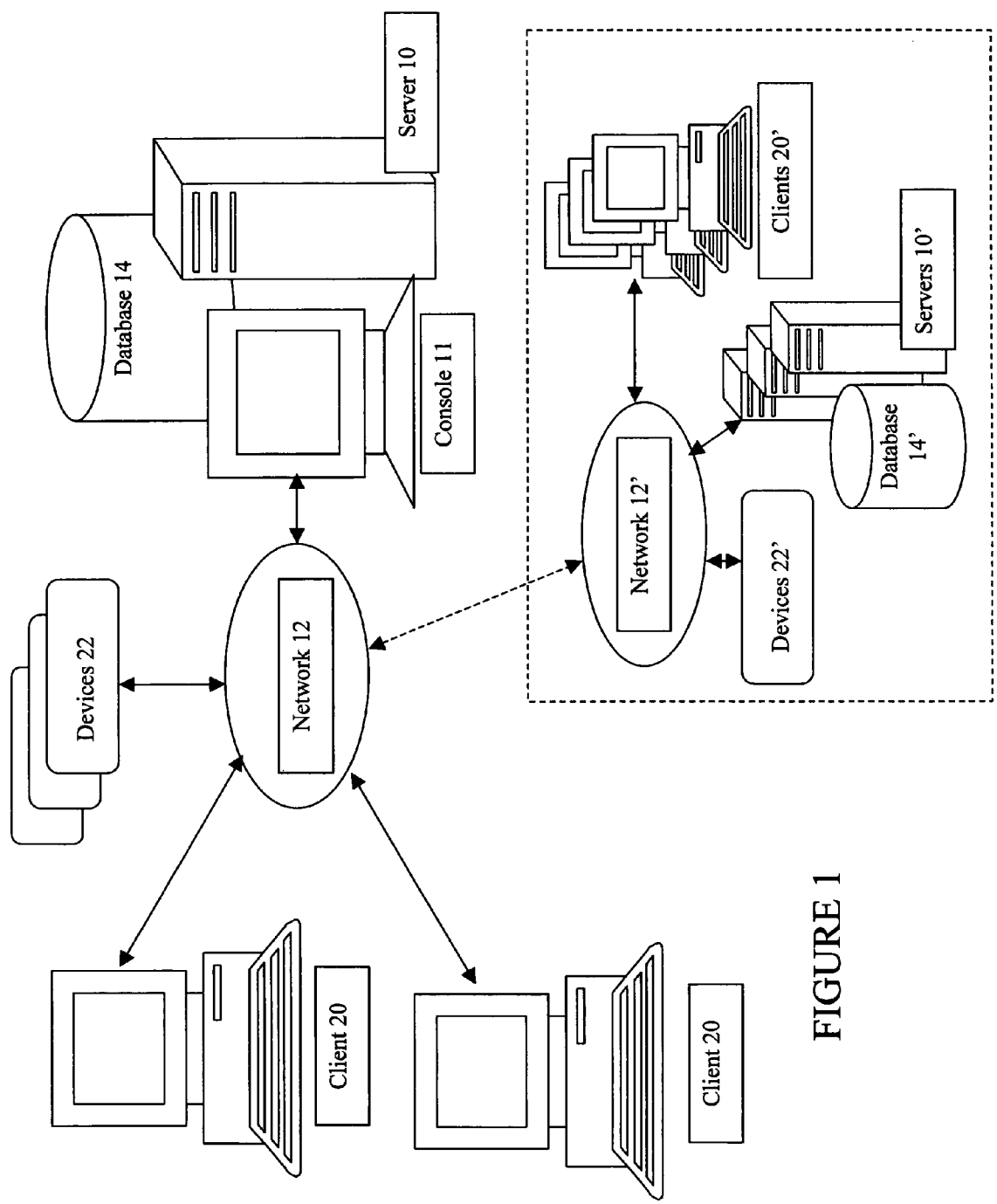
FIG. 1 is an exemplary hardware environment used to implement the preferred embodiment of the invention.

It should be understood that in certain situations for reasons of computational efficiency or ease of maintenance, the ordering and relationships of the blocks of the illustrated flow charts could be rearranged or re-associated by one skilled in the art. While the present invention will be described with reference to the details of the embodiments of the invention shown in the drawings, these details are not intended to limit the scope of the invention.

DETAILED DESCRIPTION

To facilitate an understanding of the present invention, it is described hereinafter with reference to specific implementations thereof. The invention is described in the general context of computer-executable instructions, such as program modules, being executed by a computer. Generally, program modules include routines, programs, objects, components, data structures, etc. that perform particular tasks or implement particular abstract data types. For example, the software programs that underlie the invention can be coded in different languages, for use with different platforms. In the description that follows, examples of the invention are described in the context of software code that has been inserted as an inline action. It will be appreciated, however, that the principles that underlie the invention can be implemented with other types of computer software technologies as well.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

DEFINITIONS

Throughout the specification, the following terms are used as defined herein:

Enterprise Network: In a large enterprise, a distributed network of computer systems which can span diverse geographical locations and encompass a range of platforms, operating systems, protocols, and network architectures.

Server: A personal computer, a minicomputer, or a mainframe which provides some service for other computers connected to it via a network such as data management (information sharing between clients), network administration, security, and other back-end functions.

Client: A computer system or process that requests a service of another computer system or process (a "server") using some kind of protocol and accepts the server's responses. A client is part of a client/server software architecture.

Client/server architecture: A common form of distributed system in which software is split between server tasks and client tasks. In operation, a client sends requests to a server, asking for information or action, and the server responds.

NMS: Network Management System

Management Server: The central reception and correlation server for a Network Management System (NMS) (e.g., an IBM AIX Server running Tivoli NMS software).

Remedy Server: An external server running some version of problem reporting and tracking software. (In this instance, an HP-UX Remedy Server).

Operations Console: A user desktop system usually staffed by monitoring operations personnel and connected to a Management Server for monitoring of the live event feed from a Network Management System.

Managed or Monitored Device/Element/Object: A server (e.g., NT or UNIX) or network device/object (e.g., router, switch, hub, etc.). The managed device element (server or network object) is monitored for faults by the NMS. This end device (server or network object) may be polled by the NMS. Transient events in an object may cause the reporting of false positives to the NMS.

Triage: A unique process of the present invention that validates a reported event in an effort to reduce the occurrence of false positive event detections within the NMS.

Managed Domain: A logical grouping of managed device elements representing either a geographic or functional relationship with other managed elements, as more particularly described in co-pending and commonly owned U.S. application entitled "APPARATUS AND METHOD FOR DISPLAYING NETWORK SYSTEMS DATA MATCHED TO USER FUNCTION FOR EFFICIENT NETWORK SYSTEMS MANAGEMENT" filed Nov. 14, 2003 Ser. No. 10/714,432, hereby incorporated herein by reference.

Interp (interpretation) Type: This is a classification of a managed element device type. Interp types include classifications such as Windows, UNIX, and Network.

Event Type: A classification of a detected event for the purpose of defining and categorizing events into known groups.

Database: One or more large structured sets of persistent data, usually associated with software to update and query the data. A relational database allows the definition of data structures, storage and retrieval operations and integrity constraints. In such a database the data and relations between them are organized in tables.

Overview

Referring now to the drawings, embodiments of the present invention will be described. Generally speaking, the invention provides a method for validating a reported event in an effort to reduce the occurrence of false positive event detections on a network management server. It allows for active validation of received alarms. It performs automated validation of reported alarms based upon an understanding of the alarm type, and performs automated event validation for both data communication networks and server systems.

The method specifically includes launching a new process or script with a unique method for problem validation to verify the status/accuracy of the reported alarm. The invention interprets the results of these active validation responses and makes informed decisions as to the nature and accuracy of the reported problem. The invention can forward, drop, or redirect an event based upon the results of its active validation steps. The invention does not aggregate alarms from multiple network management servers. It performs its validation function layered on top of an aggregation and correlation solution. The invention performs automated event validation through the use of standardized response and validation steps. The validation functionality is effective over the spectrum of customer environments, and does not require initial/additional tuning and configuration in order to be operable.

Hardware Environment

Referring to FIG. 1, as an example, a simple computing system environment/network in which the present invention may be implemented in a client/server arrangement. In an exemplary embodiment, computing system includes at least one server 10, and a plurality of client computers 20 capable of accessing the applications on server 10 through a network 12. Server 10 may comprise a network server, a management server, a remedy server, a data storage server, other type of server, or a combination thereof. The hardware employed for the server 10 may comprise one or more general-purpose computers and attached devices such as an operations console 11. The server is connected over a network 12 to a number of clients 20. Server 10 may be additionally coupled to one or more servers which are registered with the server as clients. Additional devices 22 (e.g., router, switch, hub) are also connected on the network 12. The client computer 20 may be any of a number of known computers, or network of computers, capable of supporting a web browser such as Microsoft Internet Explorer or Netscape Navigator.

Server 10 and client computer 20 are coupled to one another via a network 12, such as an Intranet or the Internet. Network 12 may be connected to another network 12' wherein that network includes servers 10', clients 20', databases 14' and devices 22'. All of the interconnected components and networks form an "enterprise." Each of the components across the network may be managed and monitored by a network management system on a Management Server. Network management systems provide network management data for IT professionals and administrators as known in the art.

More specifically, the client computers 20 are preferably complete, stand-alone, personal computers offering a full range of power and features to run applications. The client computer preferably operates under any operating system and includes communication devices, input devices, storage devices, and display devices. The user enters input commands into the computer processor through input devices that could comprise a keyboard, mouse, or the like. Alternatively, the input device could comprise any device used to transfer information or commands. The display comprises a computer monitor, television, LCD, LED, or any other means to convey information to the user.

The server computer(s) can be a personal computer, a minicomputer, or a mainframe and offer data management (information sharing between clients), network administration, security, web services, and other functions.

At least one database 14 may be employed as known in the art which may comprise one or more hard disk drives and computer memory. The database 14 may reside on the server computer 10 or may reside on a separate computer in communication with the server computer via a network 12 such as the Internet. Likewise, the database 14 may reside on media such as a CD-ROM accessible using a CD-ROM drive associated with the server computer 10.

The enterprise (or part of the enterprise) is managed by an IT administrator/operator, for example, at an operations console 11. Typically, the console is merely a graphical user interface (GUI) front-end to a management server to view displayed information and to enter commands for performing management operations. Alternately, the operations console 11 may include remote operation at a remote machine, as known in the art. For example a Tivoli/Enterprise Console (TEC), which comprises a Tivoli application for centralizing automated operations and event processing may be utilized. The Tivoli Enterprise Console (TEC) is used to receive and process events as known in the art. The TEC processes and correlates common management events from different system and network components and initiates corrective action. The TEC can act on events using either automatic or operator-initiated responses.

The operation of the invention is accomplished through a number of software components (code). The code (e.g., triage code) is executed (run) to implement the automated validation methods of the present invention. Such code may be written in a variety of computer languages, such as Perl programming language. The present method could also be implemented in a variety of ways, such as by comprising a portion of an operating system source code, as part of an application or simply as an independent program or script, such as one written in the programming languages Java, C++, and the like. Automated validation of the present invention basically provides (1) monitoring of an object of a system and providing event information descriptive of a problem with the object; (2) selecting a utility program with descriptors matched to features of the object; (3) extracting from the event information selected arguments descriptive of the problem; and (4) passing the arguments to the utility program producing a true/false validation indication.

The present invention also envisions other computing arrangements for the client/server components, including processing on a single machine such as a mainframe, a collection of machines, or other suitable means. Although many other internal components of the client/server components are not shown, those of ordinary skill in the art will appreciate that such components and the interconnection are well known. Accordingly, additional details concerning the internal construction of the client/server components and networking need not be disclosed in connection with the present invention.

For large-scale data collecting, another embodiment could include using the above-described method with a plurality of databases and a search service, or separate process, for conducting a search across multiple databases. As will be understood by those skilled in the art, the search service receives requests from the server computer and conducts a search of corresponding data among the plurality of databases as described above for a single database.

Event Processing

The event-processing method developed for the present invention, referred to herein as the "automated triage method" provides for automatic interpretation and disposition of systems management events to remove the necessity for live operator responses to every event. It should be understood that in certain situations for reasons of computational efficiency or ease of maintenance, the ordering and relationships of the blocks of the illustrated flow charts could be rearranged or re-associated by one skilled in the art.

During systems management, events generated on individual systems (objects) are usually sent to central Event Reception Engine (including events from other applications like NetView network management application). The Event Reception Engine is associated with an operation console such as the Tivoli Enterprise Console to display the received event to an operator. For example, when a managed element incurs a problem or monitoring threshold violation, the NMS (Network Management System) detects this problem and creates an alert within the NMS system. The alert is passed upstream from the managed element to the NMS management server. The source of this alert can originate from a monitoring agent residing locally on the managed element, or by a remote server polling the managed element across the network. When the alert arrives at the management station, the alert is processed by the management station reception engine (e.g., Tivoli Enterprise Console). At this point, the alert would traditionally be processed by the reception engine and dispatched and/or displayed to personnel according to the existing art processes and technologies.

The automated triage method of the present invention has been inserted as an inline action to improve the functionality of the NMS system. Instead of employing manual event validation/remediation and processing, the operator can selectively run the "automated triage" method of the present invention to validate the received event. Alternately, the "automated triage" method can run automatically. The event reception engine invokes the automated triage method as an inline action after initial reception of the event. As such, the invention incorporates validation and remediation into the event dispatch process. For example, the method is invoked by executing a Perl script, and passing the environmental variables that are descriptive of the event. When the method is invoked, it reads in the environment to ascertain key details of the detected event including the occurrence date, the event class, the device "Interp" type, and the managed domain. Once these descriptors have been retrieved, the program searches the triage scripts directory for the appropriate scripts/program (e.g., for a triage_{Event_Class}.pl program). For all events which require additional triage, a script/program exists (e.g., an triage_{Event_Class}.pl program). If the event does not require additional triage, no program exists, and the event is passed back to the NMS reception engine for normal processing.

Figure 2:
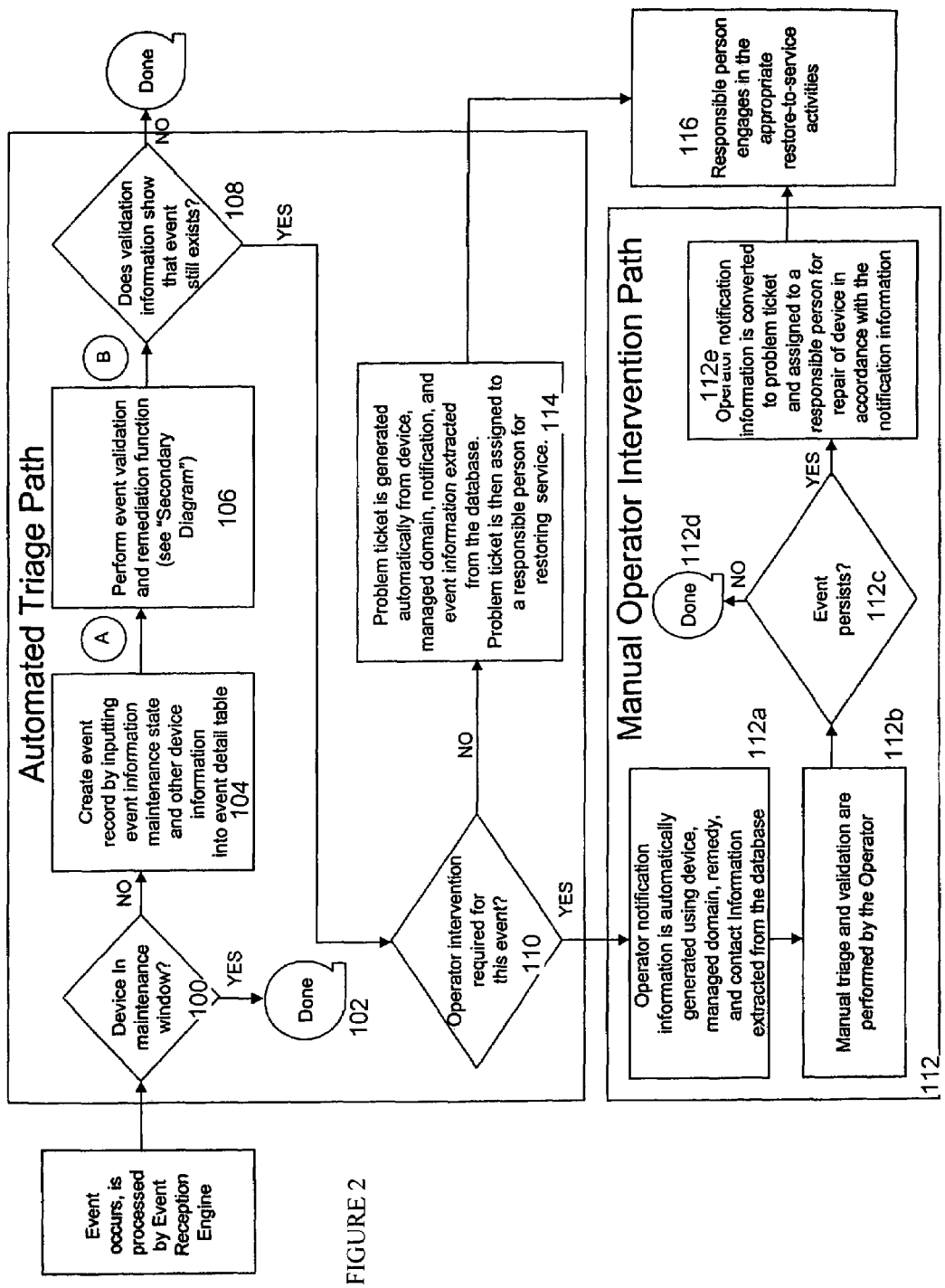
FIG. 2 is a flow diagram illustrating the steps performed in practicing an embodiment of the present invention to perform automated triage of an event.

The automated triage method is illustrated in the flowchart of FIG. 2. The flowchart includes various procedures to implement the features of the present invention. At decision step 100 in the automated triage method, an initial determination is made as to whether the device reporting the event is currently scheduled in a maintenance window. If the reporting device is in a maintenance window, then the YES path is followed and the event processing ends at block 102 wherein the event is dropped since the device is currently undergoing maintenance.

If the device is not currently in maintenance, then the NO path is followed and an initial record of the event is created in an event detail table as an "event record" in block 104. This event record includes high-level information such as the source device, type of event, and time received. The specific handling of each event class is configurable within the automated triage event processing method.

Figure 3:
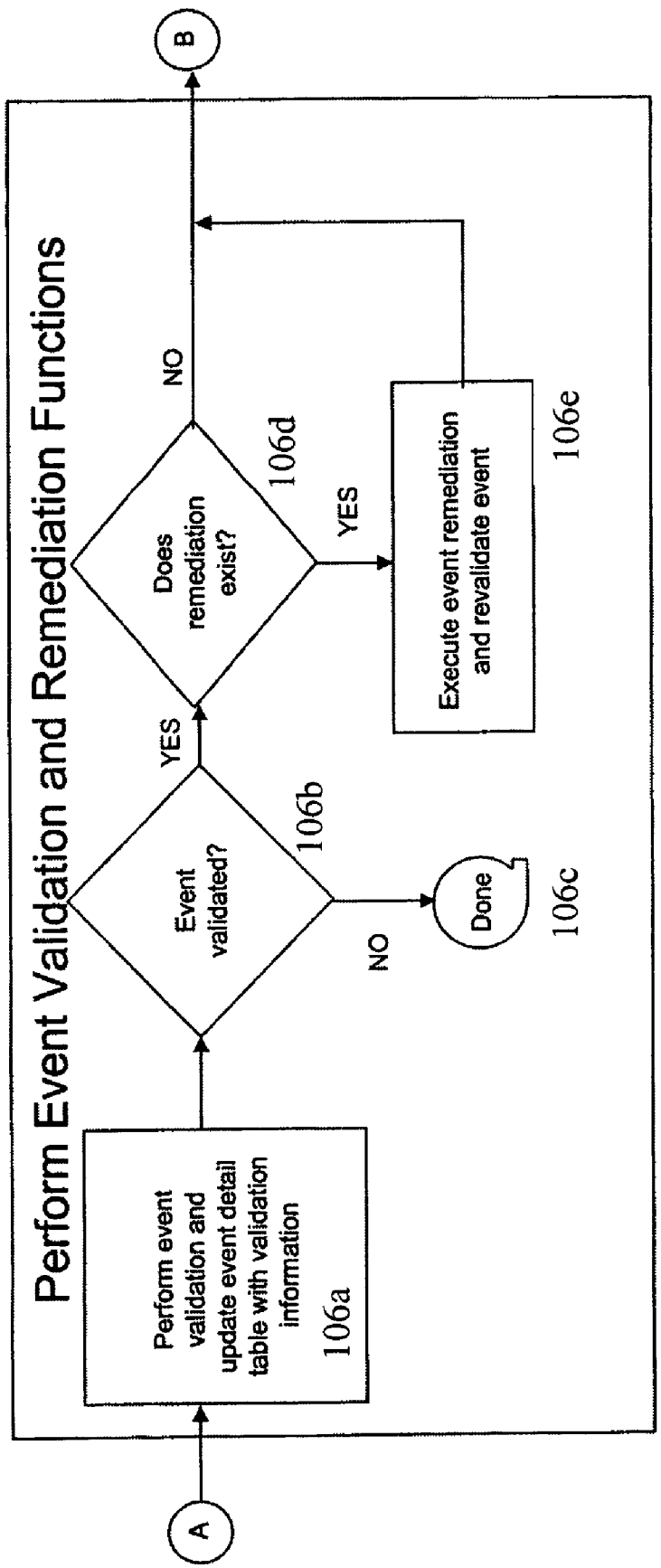
FIG. 3 is a flow diagram illustrating the event validation and remediation functions of the present invention.

Once the event record is created, the method proceeds to "Event Validation/Remediation" in block 106. The details of steps processed in block 106 are illustrated in FIG. 3. First event validation is performed and the event detail table is updated with validation information in block 106a. Specifically, the method executes event validation to confirm the event status. As a result of this command execution, the event is either validated as being a true event, or it is determined to be a false or transient event. This information (the validation status and validation command output) is appended to the event record within the event detail table. In certain situations where there is not a validation method available to verify an event, the process can skip the "Event Validation/Remediation" step and proceed to normal processing.

The method then proceeds to decisional step 102b to determine whether the event was validated. If the event was not validated, the NO path is followed, ending the triage method at block 106c.

If the event was validated, the method proceeds to decisional step 106d to determine whether remediation exists for the event. If no remediation exists, then the NO path is followed and the method proceeds out of block 106 to decisional step 108. If remediation exists, then the YES path is followed and the event remediation is executed and the event is revalidated in block 106e. A remediation method is an automated task or script that can correct a specific event type without manual intervention. If a remediation method exists, the model executes this method and then proceeds out of block 106 to decisional step 108.

In decisional step 108 the method determines whether the remediation method was successful or whether the event still exists. If the remediation effort was not successful, or no remediation method was available, the YES path is taken to decisional step 110. If, on the other hand, the remediation was successful whereby the event no longer exists, the NO path is taken and the automated triage method ends in block 112.

The method provides two paths for notification, one fully automated path (block 114), and one that permits operator intervention (block 112) for compatibility with legacy data center operations mode.

In decisional step 110, the method determines whether operator intervention is required for the event (i.e., whether the reported event type should follow the fully automated path of block 114, or be forwarded to an operations staff member of block 112). If operator intervention is required, then the YES path is following leading to Manual Operator Intervention in block 112.

During Manual Operator Intervention, the following steps are taken. Initially, in block 112a, the validated event is looked up in the enterprise management data model. Key notification information such as notification queue/e-mail address/pager, event severity, assignment, and location is extracted from the database. This information is in turn used to convert the validated event into an operator notification. This operator notification can take the form of an event in a text browser, a pop-up alert, or an entry in a web-based event log. The method then proceeds to block 112b where the operator then uses the information in the operator notification to perform additional manual event triage.

Then in decisional step 112c, it is determined whether the event still persists. If not, then the NO path is taken and the triage method ends in block 112d. Otherwise, the YES path is taken to block 112e where the problem notification conversion is invoked. This conversion step automatically takes the information provided in the operator notification and creates a problem notification. This problem notification can take the form of an assigned problem ticket, a notification e-mail, or a pager notification. The notification is sent to the responsible person to engage the appropriate restore-to service activities in block 116.

If operation intervention is not required in decision step 118, the NO path is taken to the fully automated path in block 114. In block 114, the validated event is looked up in the enterprise management data model. Key notification information such as notification queue/e-mail address/pager, event severity, assignment, and location is extracted from the database. This information is in turn used to convert the validated event into a problem notification. This problem notification can take the form of an assigned problem ticket, a notification e-mail, or a pager notification. The notification is sent to the responsible person to engage the appropriate restore-to service activities in block 116.

Event Response Actions

The event response actions performed in Event Validation/Remediation step 106 are individual validation or remediation processes and scripts created to facilitate automated problem validation and response. Many of these capabilities can incorporate existing vendor utilities for determining systems or network status. The key differentiator within automated triage is that these utilities have been encapsulated in such a manner as to permit automated invocation based upon parameters in a systems monitoring alert. Each of these response actions is specific to the problem type recorded in the event, providing for meaningful and concise triage validation data.

Example Triage Scripts

As an example, the following Perl triage programs "triage_{Event_Class}.pl" are defined within the automated triage program.

| | | |
|---|---|---|
| triage_DM_Status.pl | triage_Port_Monitor.pl | triage_diskavail.pl |
| triage_HTTP_Status.pl | triage_PrcFreeSpace.pl | triage_NT_Services.pl |
| triage_Sendmail_Monitor.pl | triage_filesystempctf.pl | triage_Node_Status.pl |
| triage_TMA_Status.pl | triage_if_Status.pl | triage_daemon.pl |
| triage_NtServices.pl | triage_default.pl | triage_rebootStatus.pl |

When the automated triage method finds a corresponding triage_{Event_Class}.pl program, it invokes that program, passing the event details within the shell environment. Each of the triage_{Event_Class}.pl programs contain unique methods for validating their specific event classes. These validation methods provide an alternate method for detection and validation of the reported event. This provides a "second opinion" of the reported event. The benefit of this "second opinion" is an overall reduction in the reporting of false positive or transient system events.

The mechanism for executing the secondary validation varies depending on the managed element Interp type and the event class. For server systems, the validation may be executed locally on the server utilizing the NMS management agent. For network devices, the validation may be executed from the remote management server. Each of the triage_{Event_Class}.pl programs executes the validation tasks and then analyzes the return code. Based upon the return code, the Perl program instructs the main automated triage Perl program to either pass the event back to the reception engine for further processing as a validated event, or to drop the vent as a false positive, transient, or secondary event. An example of a secondary event might be an alert generated because of some other outage on the system, like a web page unavailable alert which occurs after the hosting web server has gone offline.

In addition to passing the event back to the reception engine for processing, the automated triage script also adds a new environmental variable which contains the results of the triage activity. This information is used by the reception engine when creating a problem ticket or notification. This information is added to the problem ticket record so that the responding administrator can view the state of the system (the validation results) at the time of the event detection.

Accordingly, the invention provides a solution that incorporates validation and remediation into the event dispatch process. The previously available event forwarding solutions were simple forwarding interfaces. If false or transient event notifications were received on one side, they are forwarded to the tracking system without filtering. This is one of the main reasons network operations centers rely on operational support labor. The support labor serves as a filter for false alerts and/or event storms that would normally flood the problem tracking system. The present invention provides for the automated event path with the additional steps of validation, remediation, and interpretation built in. It combines the time and labor savings advantages of the direct path system with the event validity advantages or the traditional manned operations system.

Accordingly, the automated triage method of the present invention provides a strategic advantage over existing art methodologies. The programmatic execution and interpretation of event triage and validation provide a measurable improvement in service delivery. The mean time between detection and dispatch is reduced significantly with programmatic versus manual triage execution. This reduces the dispatch time component in the mean time to restore an affected system. The programmatic interpretation of event triage and validation return codes ensures repeatable and consistent processing of detected events. The same validation methodologies and interpretation steps are executed on every event of that class, removing the possibility for human misinterpretation.

EXAMPLES

The following examples illustrate procedures for practicing the invention and should not be construed as limiting.

Operation Detail Example 1

Figure 4:
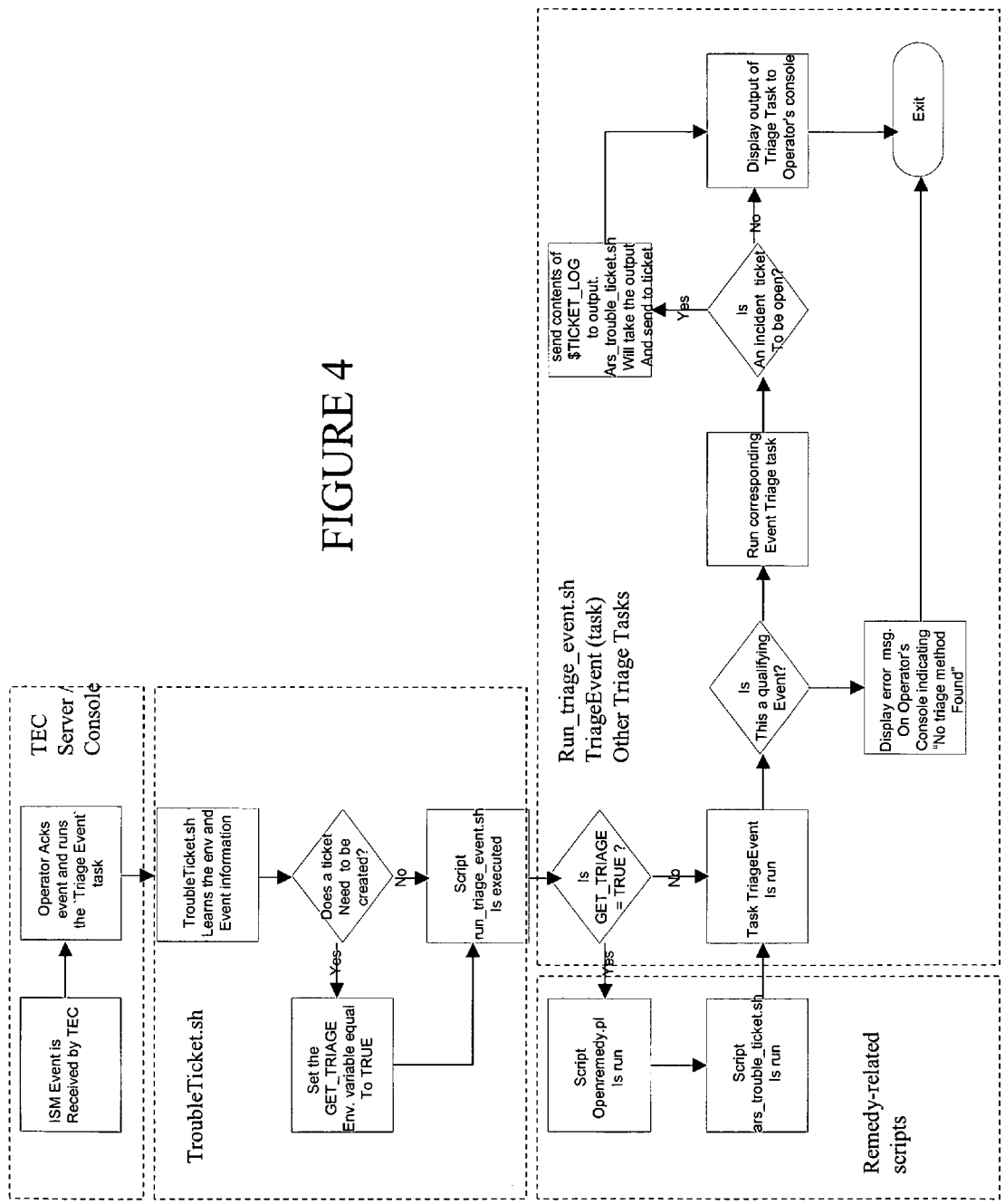
FIG. 4 is a flow diagram illustrating a specific example of the event flow in an alternate embodiment.
Figure 5:
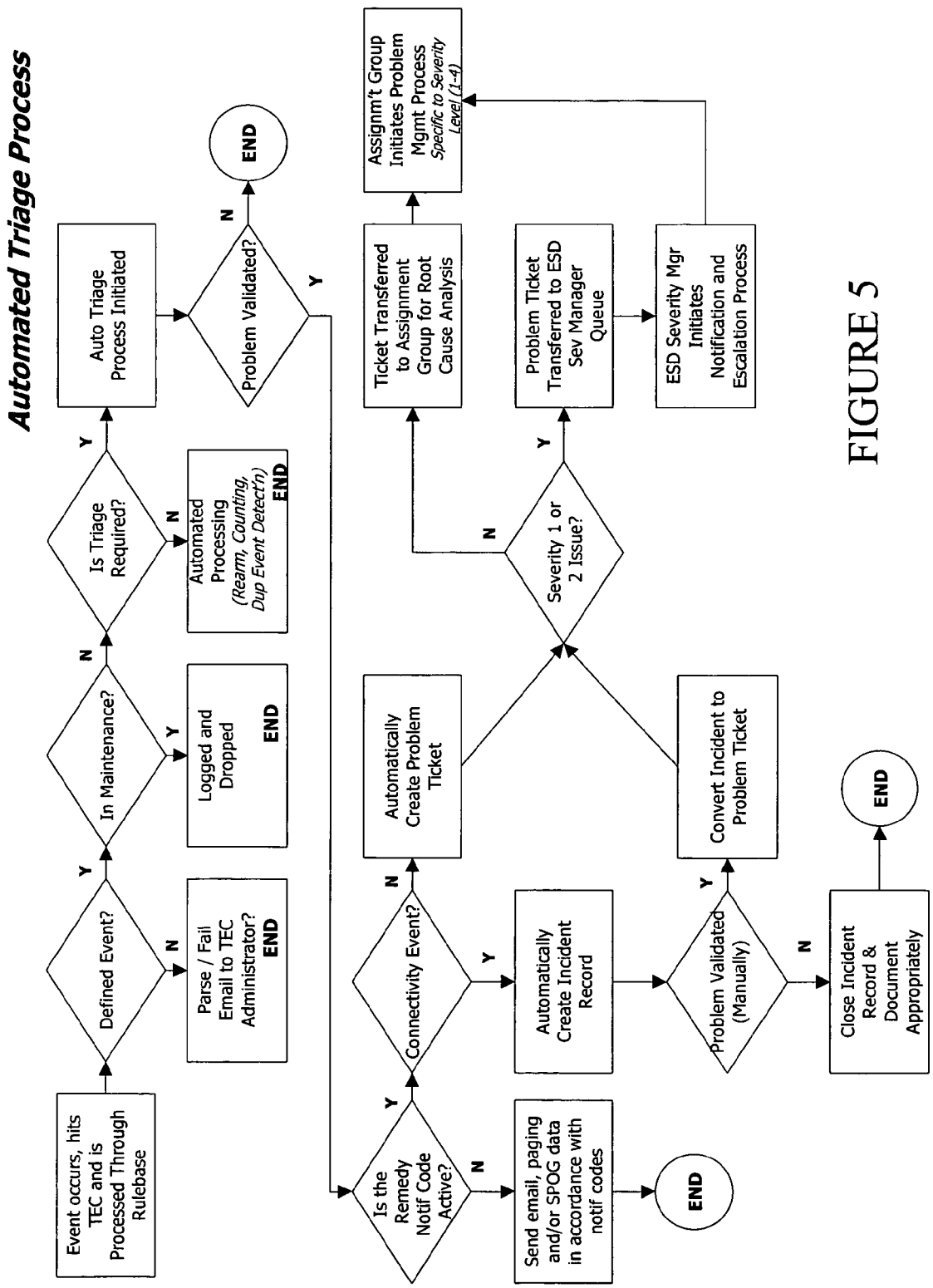
FIG. 5 is a flow diagram illustrating a specific example of the event flow in an alternate embodiment.

The automated triage utilizes several Tivoli tasks to gather, correlate, display, and triage events. FIG. 4 illustrates an example of the automated event triage flow from the input of a correlated event to the output of a triage result. In the example, the following qualifying events in Table 1 are being addressed with the automated triage tasks. Events that are not in the list of qualified events will default to a triage task that assumes the event has been validated (triage_default).

TABLE 1

| | Qualifying Events: |
|---|---|
| a. | LM_*_Node_Status |
| b. | LM_*_if_Status |
| c. | LM_*_TMA_Status |
| d. | LM_*_rebootStatus |
| e. | LM_*_daemon |
| f. | LM_*_NtServices |
| g. | LM_*_NT_Services |
| h. | LM_*_PrcFreeSpace |
| i. | LM_*_diskavail |
| j. | LM_*_filesystempctf |
| k. | LM_*_DM_Status |

TABLE 1-continued

Qualifying Events:

| | |
|---|---|
| l. | LM__DMPROBE.MON.ISM*** |
| m. | LM_*__HTTP__Status |
| n. | LM_*__Port__Monitor |
| o. | LM_*__Sendmail__Monitor |

The automated triage system (hereafter referred to as AutoTriage) makes use of scripts and Tivoli tasks automatically called based on event information. Upon receipt of the event, AutoTriage gets invoked and makes use of subroutines (dynamically loaded), to validate event status. The name of the subroutines script that is dynamically loaded is dependant on the Event Class environment variable of the event being triaged. Once a dynamic script is loaded, AutoTriage makes use of two subroutines, which are contained in the external script that is dynamically loaded.

Table 2 illustrates the first of these subroutines, "run_triage( )", handles all the necessary queries and tasks to validate the event and analyze the results. In addition, the main AutoTriage system expects two environment variables to have been set by the run_triage( ) subroutine.

TABLE 2

Subroutine run_triage( ):

$ENV{PROBLEM_VALIDATED}:

Expected values are 0, 1, 2, −1, −2, or −3.
   0: No Problem Found. Problem is not validated.
   1: Problem exists. Will go on with ticket creation if required.
   2: Problem existed, but was fix by automated tasks.
   3: Field reserved for future capabilities.
 −1: Task failed to execute, however,
      there's reasonable logic that indicates the problem
      may be valid. Will go on with ticket creation if required . . .
 −2: Task failed to execute. An unknown anomaly,
      possibly with the toolset,
      was found. Will need to create a ticket.
 −3: Event correlated. Certain conditions were met that indicate
      this event should not be forwarded due to possible correlation.
$ENV{TRIAGE_PATH}:

This variable contains the full path of the file that contains the triage results.

The second subroutine, "after_check( )", performs any necessary validation checks to be made after the PROBLEM_VALIDATED & TRIAGE_PATH environment variables have been set. The AutoTriage dynamic scripts contain at least these two subroutines as they are called from the main subsystem. Additional subroutines can be used in each dynamic script if it would benefit task completion. AutoTriage has the capability to interpret the results of the validation and assign a validation code based on the interpretation. Finally, AutoTriage sends the problem validation code as well as triage information to the program responsible for opening problem tickets in order to make a decision (ars_trouble_ticket.sh script located in $BINDIR/TME/TEC/scripts directory). AutoTriage uses flexibility in its implementation to allow an Operator the ability to run it on demand against an event currently on the TEC console. In this scenario, the Operator calls the automated triage task by clicking 'Task' from the TEC browser menu and selecting the 'Triage Event' button. This task button then calls the TroubleTicket.sh script (located in $BINDIR/TME/TEC directory) with the appropriate arguments and passes all the event's environment variables. When AutoTriage is called on demand, TroubleTicket.sh sets Tivoli related environment variables and calls the $BINDIR/../../local/bin/run_triage_event.sh script to initiate triage processing. The run_triage_event.sh script initializes more environment variables and calls the following task either directly (Triage Only) or through the openremedy.pl (Triage & Ticket) script:
   Task Name TriageEvent
   TaskLibrary Name: ism.tasks.$ {tmr}

Where $ {tmr} is the TMR name as provided by the 'wtmrname' Tivoli command. The source script for the TriageEvent task is located in the following directory:

$BINDIR/../../tasks/ism.tasks/triage_event.pl
   In order to modify the TriageEvent task, you must edit the triage_event.pl script using appropriate change control, and update the TriageEvent task using the triage_event.config file located in the same directory as the triage_event.sh script:

$BINDIR/../../tasks/ism.tasks/triage_event.config
   Event Listing
   The following section lists qualified events currently being handled by the AutoTriage in this example. Each event category has an associated dynamic script that executes the necessary tasks to complete triage. (triage_${EventClass}.pl).
   Node Status: The Node Status triage script is responsible for verifying Node reachability from a device's corresponding NetView Server. This step is responsible for verifying IP connectivity and/or SNMP reachability and "last hop" information. An important function of this script is to be able to determine if the device is unavailable from the network. Node Status Specifics: Event Class supported: LM_*_Node_Status; Dynamic Script: triage_Node_Status.pl; Script Location: $ENV{BINDIR}\..\..\local\bin; Environment Variables Updated: $ENV{PROBLEM_VALIDATED} Status completion code of task (0, 1, −1, −2); $ENV{TRIAGE_PATH} Path of the file that contains the triage results. Tivoli tasks called by Node Status triage script: Task used: TestPing; Task Library: netview.tasks.$ {tmr}; User Name: tivadm; Group Name:; Task ACL: user; Source script of task: BINDIR/../../tasks/netview.tasks/run_test_ping.sh; Config File: BINDIR/../../tasks/netview.tasks/run_test_ping.config; Special Notes: <none>.

Interface Status: The Interface Status triage script is responsible for verifying Operational Status of a device's interface from its corresponding NetView Server. This script is responsible for verifying IP connectivity and SNMP information gathering. An important function of this script is to be able to determine the true operational status of an interface even if the IP address is not reachable. Specifics: Event Class supported: LM_*_if_Status; Dynamic Script: triage_if_Status.pl; Script Location: $ENV{BINDIR}\..\..\local\bin; Environment Variables Updated: $ENV{PROBLEM_VALIDATED} Status completion code of task (0, 1, −1, −2); $ENV{TRIAGE_PATH} Path of the file that contains the triage results.

The following are Tivoli tasks called by this dynamic Script

Non-LMCI Interfaces
   Task used: TestPing (None LMCI interfaces)
   Task Library: netview.tasks.$ {tmr}
   User Name: tivadm
   Group Name:
   Task ACL: user
   Source script of task: BINDIR/../../tasks/netview.tasks/
     run_test_ping.sh
   Config File: BINDIR/../../tasks/netview.tasks/run_test_
     ping.config Special Notes For LMCI devices, the TEC_Show_if_Task is run in addition to TestPing.

LMCI Interfaces
    Task used: TEC_Show_if_Task (LMCI interfaces)
    Task Library: netview.tasks.$ {tmr}
    User Name: *
    Group Name:
    Task ACL: user
    Source script of task: BINDIR/../../tasks/netview.tasks/TEC_Show_if_Task.sh
    Config File: BINDIR/../../tasks/netview.tasks/TEC_Show_if_Task.config
    Special Notes In addition to the TEC_Show_if_Task, TestPing is run for LMCI Interface events.

TMA Status: The TMA Status triage script is responsible for verifying the reachability status of a Tivoli Endpoint. This script is responsible for verifying Endpoint connectivity. Additionally, if an Endpoint fails to respond to a status query, the script will test IP and/or SNMP reachability and gather "last hop" information. An important function of this script is to be able to determine if the Endpoint is Down or the device is unavailable from the network.
    Event Class supported: LM_*_TMA_Status
    Dynamic Script: triage_TMA_Status.pl
    Script Location: $ENV{BINDIR}\..\..\local\bin
    Environment Variables Updated:
        $ENV{PROBLEM_VALIDATED} Status completion code of task (0, 1, −1, −2)
        $ENV{TRIAGE_PATH} Path of the file that contains the triage results
    The following are Tivoli tasks called by this dynamic Script
    Task used: wepstat
    Task Library: ESCOps
    User Name: tivadm
    Group Name: tivgrp
    Task ACL: user
    Source script of task: BINDIR/../../tasks/ESCOps/wepstat
    Config File: BINDIR/../../tasks/ESCOps/wepstat.config
    Special Notes: <none>
    Task used: TestPing
    Task Library: netview.tasks.$ {tmr}
    User Name: tivadm
    Group Name:
    Task ACL: user
    Source script of task: BINDIR/../../tasks/netview.tasks/run_test_ping.sh
    Config File: BINDIR/../../tasks/netview.tasks/run_test_ping.config
    Special Notes: TestPing is only run if the Endpoint is unreachable Reboot Status: The Reboot Status triage script is responsible for verifying, if a Device has a system Uptime of less than 10 minutes. This script will also test general Node reachability from a device's corresponding NetView Server. The script performs SNMP queries to determine the system Uptime.
    Event Class supported: LM_*_rebootStatus
    Dynamic Script: triage_rebootStatus.pl
    Script Location: $ENV{BINDIR}\..\..\local\bin
    Environment Variables Updated:
        $ENV{PROBLEM_VALIDATED} Status completion code of task (0, 1, −1, −2)
        $ENV{TRIAGE_PATH} Path of the file that contains the triage results
    The following are Tivoli tasks called by this dynamic Script
    Task used: TestPing
    Task Library: netview.tasks.$ {tmr}
    User Name: tivadm
    Group Name:
    Task ACL: user
    Source script of task: BINDIR/../../tasks/netview.tasks/run_test_ping.sh
    Config File: BINDIR/../../tasks/netview.tasks/run_test_ping.config
    Special Notes: The TestPing task provides general reachability information, but only the system Uptime information is used in determining the validation status.

Daemon
The Daemon triage script is responsible for verifying the status of a UNIX daemon. This script is responsible for performing a process table lookup and checking if the UNIX daemon in question is running.
    Event Class supported: LM_*_daemon
    Dynamic Script: triage_daemon.pl
    Script Location: $ENV{BINDIR}\..\..\local\bin
    Environment Variables Updated:
        $ENV{PROBLEM_VALIDATED} Status completion code of task (0, 1, −1, −2)
        $ENV{TRIAGE_PATH} Path of the file that contains the triage results
    The following are Tivoli tasks called by this dynamic Script
    Task used: check_daemon_stat
    Task Library: ism.tasks.$ {tmr}
    User Name: tivadm
    Group Name: tivgrp
    Task ACL: user
    Source script of task: BINDIR/../../tasks/ism.tasks/check_daemon_stat
    Config File: BINDIR/../../tasks/ism.tasks/check_daemon_stat.config
    Special Notes: <none>

NT Services: The NT Services triage scripts are responsible for verifying the status of an NT Service. These scripts are responsible for performing a process table lookup and checking if the NT Service in question is running. An important function of this script is to be able to correlate Endpoint Down to Service Down. If the Endpoint is not reachable while performing triage, this script sets the PROBLEM_VALIDATED variable to −3 and the Event Management process knows to correlate the event and does not attempt to open a problem ticket.
    Event Classes supported: LM_*_NT_Services, LM_*_NtServices
    Dynamic Scripts: triage_NT_Services.pl, triage_NTServices.pl
    Script Location: $ENV{BINDIR}\..\..\local\bin
    Environment Variables Updated:
        $ENV{PROBLEM_VALIDATED} Status completion code of task (0, 1, −1, −2, −3)
        $ENV{TRIAGE_PATH} Path of the file that contains the triage results
    The following are Tivoli tasks called by this dynamic Script
    Task used: check_daemon_stat
    Task Library: ism.tasks.$ {tmr}
    User Name: tivadm
    Group Name: tivgrp
    Task ACL: user
    Source script of task: BINDIR/../../tasks/ism.tasks/check_daemon_stat
    Config File: BINDIR/../../tasks/ism.tasks/check_daemon_stat.config
    Special Notes: <none>

Disk/Filesystem Space: The Disk/Filesystem triage scripts are responsible for verifying the available space conditions of a drive or filesystem. These scripts are responsible for performing a disk/filesystem space lookup and checking if the disk/filesystem in question meets free space or percentage requirements. Based on the event class, the scripts will make a decision to check the available disk space or the percentage free space.

Event Classes supported: LM_*_PrcFreeSpace, LM_*_diskavail, LM_*_filesystempctf
    Dynamic Scripts: triage_PrcFreeSpace.pl, triage_diskavail.pl, triage_filesystempctf.pl
    Script Location: $ENV{BINDIR}\..\..\local\bin
    Environment Variables Updated:
        $ENV{PROBLEM_VALIDATED} Status completion code of task (0, 1, −1, −2)
        $ENV{TRIAGE_PATH} Path of the file that contains the triage results
    The following are Tivoli tasks called by this dynamic Script
    Task used: ntfsinfo_prbargonly
    Task Library: ism.tasks.${tmr}
    User Name: $root_user
    Group Name: $root_group
    Task ACL: user
    Source script of task: BINDIR/../../tasks/ism.tasks/ntfsinfo_prbargonly
    Config File: BINDIR/../../tasks/ism.tasks/ntfsinfo_prbargonly.config
    Special Notes: <none>
    Task used: diskchk_prbargonly
    Task Library: ism.tasks.${tmr}
    User Name: $root_user
    Group Name: $root_group
    Task ACL: user
    Source script of task: BINDIR/../../tasks/ism.tasks/diskchk_prbargonly
    Config File: BINDIR/../../tasks/ism.tasks/diskchk_prbargonly.config
    Special Notes: <none>

DM Status: The DM Status triage script is responsible for verifying the status of the standard DM Engine running on a Tivoli Endpoint. This script is responsible for verifying Endpoint reachability, last update to DM Engine file, and the number of DM Engines running on the Endpoint. An important function of this script is to perform corrective actions if the number of DM engines running is not 1, or if its file is "old".

Event Class supported: LM_*_DM_Status, LM_DM-PROBE.MON.ISM***
    Dynamic Script: triage_DM_Status.pl
    Script Location: $ENV{BINDIR}\..\..\local\bin
    Environment Variables Updated:
        $ENV{PROBLEM_VALIDATED} Status completion code of task (0, 1, 2, 1, −2)
        $ENV{TRIAGE_PATH} Path of the file that contains the triage results
    The following are Tivoli tasks called by this dynamic Script
    Task used: CheckDM
    Task Library: ism.tasks.${tmr}
    User Name: $root_user
    Group Name: tivgrp
    Task ACL: user
    Source script of task: BINDIR/../../tasks/ism.tasks/check_dm.sh
    Config File: BINDIR/../../tasks/ism.tasks/check_dm.config
    Special Notes: CheckDM may be called more than once when minor DM Engine problems occur. It has the capability to correct some of those minor problems.
    Task used: FixDM
    Task Library: ism.tasks.${tmr}
    User Name: tivadm
    Group Name: tivgrp
    Task ACL: user
    Source script of task: BINDIR/../../tasks/ism.tasks/fixdm.pl
    Config File: BINDIR/../../tasks/ism.tasks/fixdm.config
    Special Notes: FixDM kills the DM Engine and removes configuration directories on the Endpoint. Additionally, this task re-distributes DM monitors to the Endpoint. NOTE: Currently, this task is not called by triage_DM_Status.pl, but it is left here for documentation purposes.

HTTP Status: The HTTP Status triage script is responsible for verifying the availability of a specific URL from the TMR Server. This script uses the LWP::UserAgent perl module to query the URL and determine the connection success status.

Event Class supported: LM_*_HTTP_Status
    Dynamic Script: triage_HTTP_Status.pl
    Script Location: $ENV{BINDIR}\..\..\local\bin
    Environment Variables Updated:
        $ENV{PROBLEM_VALIDATED} Status completion code of task (0, 1, −1, −2)
        $ENV{TRIAGE_PATH} Path of the file that contains the triage results
    The following are Tivoli tasks called by this dynamic Script
    Task used: <none>
    Task Library: <none>
    User Name: <none>
    Group Name: <none>
    Task ACL: <none>
    Source script of task: <none>
    Config File: <none>
    Special Notes: <none>

Port Monitor: The Port Monitor triage script is responsible for verifying the availability of a specific TCP port on a given device from the TMR Server. This script uses the Net::Telnet perl module to query the device on the specific port and determine the connection success status.

Event Class supported: LM_*_Port_Monitor
    Dynamic Script: triage_Port_Monitor.pl
    Script Location: $ENV{BINDIR}\..\..\local\bin
    Environment Variables Updated:
        $ENV{PROBLEM_VALIDATED} Status completion code of task (0, 1, −1)
        $ENV{TRIAGE_PATH} Path of the file that contains the triage results
    The following are Tivoli tasks called by this dynamic Script
    Task used: <none>
    Task Library: <none>
    User Name: <none>
    Group Name: <none>
    Task ACL: <none>
    Source script of task: <none>
    Config File: <none>
    Special Notes: <none>

Sendmail Monitor: The Sendmail Monitor triage script is responsible for verifying the availability of TCP port 25 on a given device from the TMR Server. This script uses the Net::Telnet perl module to query the device on this port and determine the connection success status.

Event Class supported: LM_*_Sendmail_Monitor
    Dynamic Script: triage_Sendmail_Monitor.pl
    Script Location: $ENV{BINDIR}\..\..\local\bin Environment Variables Updated:
$ENV{PROBLEM_VALIDATED} Status completion code of task (0, 1, −1)
$ENV{TRIAGE_PATH} Path of the file that contains the triage results
The following are Tivoli tasks called by this dynamic Script
Task used: <none>
Task Library: <none>
User Name: <none>
Group Name: <none>
Task ACL: <none>
Source script of task: <none>
Config File: <none>
Special Notes: <none>

Default Triage: The Default Triage script is responsible for handling any event that does not have a specific triage script. The default behavior of this script is to validate the event (PROBLEM_STATUS=1) and to use the problem summary as the triage results.
Event Class supported: Non supported Classes
Dynamic Script: triage_default.pl
Script Location: $ENV{BINDIR}\..\..\local\bin
Environment Variables Updated:
$ENV{PROBLEM_VALIDATED} Status completion code of task (1)
$ENV{TRIAGE_PATH} Path of the file that contains the triage results
The following are Tivoli tasks called by this dynamic Script
Task used: <none>
Task Library: <none>
User Name: <none>
Group Name: <none>
Task ACL: <none>
Source script of task: <none>
Config File: <none>
Special Notes: <none>

Example 2

Triage Program© Lockheed Martin

An example of a triage program, triage_daemon.pl, which performs automated validation of daemon status events:

```perl
#!/usr/bin/perl

# SCRIPT NAME: SHORT DESCRIPTION
# triage_daemon.pl: Run Triage for UNIX process down events.

# DESCRIPTION
# This script Grabs the environment variables passed to it, and runs triage
# tasks against the event.

# SYNTAX: triage_daemon.pl

# Perl Code

# The environment is learned and its variables used throughout the script.

# LOGFILE: $BINDIR/../../local/logs/triage_event.log

# USED BY
# > TEC. Called by triage_event.pl

# INPUT / DEPENDENCIES / PREREQS
# > Depends on 'subroutines.pl'

# OUTPUT (updates etc.)
# At the end, it will set two environment variables:

# $ENV{PROBLEM_VALIDATED} Expected values are either 0, 1, or
# −1.
#       0: No problem was found
#       1: Problem exists. Will go on with ticket
#       −1: Other problem found potentially with
#           ISM toolset. Will need to raise a flag.

# $ENV{TRIAGE_PATH}     This will contain the full path to the file
#           containing the triage results. It may be empty.
#           At a later point, this file will be removed.

# INSTALLATION
# > Copy 'triage daemon.pl' into "$BINDIR/../../local/bin"

# SUBROUTINE STRUCTURE / IMPLEMENTATION NOTES
# > 'run_triage' is a subroutine to run triage tasks
# > 'after_check' is a subroutine to run additional tasks after initial triage
# > 'finish' is a subroutine in "subroutines.pl"
# > 'error' is a subroutine in "subroutines.pl".
# > 'drop' is a subroutine in "subroutines.pl".
# > 'log' is a subroutine in "subroutines.pl".

# Author: Pablo Ramos
#       08/12/02

# CONTRIBUTORS

# CHANGE HISTORY

# 'run_triage' grabs environment variables and runs a triage
# task corresponding to the event being triage. This subroutine
# sets two environment variables that will be used by its
# parent script (triage_event.pl).
sub run_triage {
# This is where we add all the code
    # We need to analyze the output of the triage results to
    # determine the correct value for PROBLEM_VALIDATE.
    # At the end, we have to set these two variables.
    $ENV{PROBLEM_VALIDATED}=0;
    $ENV{TRIAGE_PATH}="/tmp/triage.$$";
    # Get the file ready for writes
    open(TRIAGE, ">$ENV{TRIAGE_PATH}");
    # The following are environment variables that we will need
    # and that are stored in slot values usually.
    &get_var("EVENT_CLASS");
    &get_var("tmr");
    &get_var("hostname");
    &get_var("probe_arg");
#Who are we doing triage for
print TRIAGE "Beginning triage for $hostname probe_arg $probe_arg \n";
# Need to check if the $hostname Endpoint is reachable
    if(!&IsEpAlive($hostname))
    {
        $ENV{PROBLEM_VALIDATED}="−1";
        # Send some information to the worklog
        print TRIAGE "While performing triage for $EVENT_CLASS Event\n";
        print TRIAGE "Endpoint Resource on Endpoint $hostname was not reachable.\n\n";
        print TRIAGE "Please perform additional triage to find the root cause of the outage.\n\n";
        close TRIAGE;
        &error("Endpoint $hostname is not available. Task won't run.");
        return;
    }
#Validate a probe_arg slot value exists.
    if ( $probe_arg eq "" )
    {
        $ENV{PROBLEM_VALIDATED}="−1";
        # Send some information to the worklog
        print TRIAGE "While performing triage for $EVENT_CLASS Event\n";
        print TRIAGE "This task will not run, missing probe_arg slot value.\n\n";
        print TRIAGE "Please perform additional triage to find the root cause
```

-continued

```
of the outage.\n\n";
    close TRIAGE;
    &error("This task will not run, on Endpoint $hostname, missing probe_arg slot value.");
    return;
}
#Clean up probe_arg to remove ticks.
    else {
        $target = $probe_arg;
        $target =~ s/\'//g;
        $new_probe_arg = $target;
    }
#Here we run the check_daemon_stat task
    print TRIAGE "wruntask -t check_daemon_stat –1 ism.tasks.$tmr -m 100 -h \@Endpoint:$hostname -a '$new_probe_arg' -o 04 \n";
    $res2 = 'wruntask -t check_daemon_stat –1 ism.tasks.$tmr -m 100 -h \@Endpoint:$hostname -a "$new_probe_arg" -o 04';
    $res2 =~ s/\#//g;
    print TRIAGE "$res2\n";
#Let's examine the result to determine validity of problem
    if ($res2 =~ /not running/) {
        $ENV{PROBLEM_VALIDATED}=1;
    }
    elsif ($res2 =~ /is running/) {
        $ENV{PROBLEM_VALIDATED}=0;
    }
    else {
        $ENV{PROBLEM_VALIDATED}="–1";
    }
$ENV{TRIAGE_PATH} = "/tmp/triage.$$";
close (TRIAGE);
}
# 'after_check'. An optional subroutine to run additional tasks after
initial triage.
sub after_check {
    # run additional
    # tasks.
    return;
}
1;
```

Example 3

Show Interface Triage Functionality Operation

The following describes an exemplary process for "Show Interface Triage Functionality" to retrieve interface information via telnet from a monitored router. As used herein, ISM means Integrated Systems Management and ESC means Enterprise Service Center.

The show interface triage functionality utilizes the Net:Telnet:Cisco CPAN modules for perl to connect to a managed router and retrieve the output from IOS based commands. In this instance the output of the show interface command is returned and parsed to filter out the pertinent triage information including interface status, line status, EIA lead status, IP Address, and interface description. In addition, if the interface is connected to an AT&T circuit, the circuit number is retrieved from the interface description text.

The Show Interface triage functionality is called from within the remote_ping triage task. If the initial ping and traceroute to the interface address fail, and the event class matches a managed domain participating in show interface triage, the show interface task is called. As with the remote ping triage task, this task opens a pop-up window on the operator desktop.

When the show interface task is called, the operator is prompted for the user level password of the device being triaged. Utilizing this password, along with the device and interface information pulled from the TEC event message, the task has sufficient information to connect to the target router and return the interface data.

As mentioned earlier, this task utilizes the net:telnet:cisco module for perl. The task is built from the perl script show_interface.pl. The task and script take a single argument containing the hostname and target interface of the device. The argument is formatted {hostname}:{interface} to match the naming conventions used within NetView.

The script performs the following steps to perform the show interface triage:

1. The script opens a telnet session to the target router my $cs = Net::Telnet::Cisco->new(Host => $ {hostname});

$cs->login(Name => Username, Password => $ {pswd});

2. The script disables terminal length buffering so that entire command output is returned my @cmd_output = $cs->cmd('terminal length 0');

3. The script then returns the output of the "show interface" command into array:

@cmd_output =$cs->cmd("show interface $interface");

4. Each line of the command output array is parsed using regular expression matching to retrieve the pertinent pieces of data including:
    a. Interface Status
    b. Line Status
    c. Interface Description
    d. AT&T Circuit Number
    e. DLCI
    f. Internet Address
    g. RTS Status
    h. CTS Status
    i. DTR Status
    j. DCD Status
    k. DSR Status 5. After parsing through the show interface output, the values for the interface and line status, as well as the EIA leads status are evaluated according to predetermined guidelines:

6. If a possible cause is identified, that information is returned to the screen. If no possible cause is identified, "No Diagnosis Available" is returned to the screen.

7. The script the prompts the operator to copy the provided triage data and then press enter to close the terminal window.
    A sample of the script output is provided below:
    $ show_interface.pl orl-hub.lmwan.lmco.com:Serial10/0/1
    Please enter the user level password for orl-hub.lmwan.lmco.com:
    Returning interface information from:
    Interface: Serial10/0/1
    Router: orl-hub.lmwan.lmco.com
    Interface Status: up
    Line Status: up (looped)
    Interface Description: <<New T1 to Stennis S Center >>
    Interface Address: 166.27.115.1/25
    RTS: up
    CTS: up
    DTR: up
    DCD: up
    DSR: up
    Possible Cause Loopback present on circuit or interface.
    Press Enter to Close Window Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc. Transmitting/receiving medium includes medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

It should be understood that the examples and embodiments described herein are for illustrative purposes only and that various modifications or changes in light thereof will be suggested to persons skilled in the art and are to be included within the spirit and purview of the claims.

The invention claimed is:

1. A method of managing events in a network to reduce operator intervention when an event representative of a problem with an object in the network is detected, comprising:
   receiving an event at reception engine representative of a problem with an object in the network;
   reading the event details of the event to determine an event class for the event;
   prior to dispatching the event by the reception engine, invoking one of a plurality automated triage processes based on the event class for the event, wherein each automated triage process is based on an event class and comprises a specific validation routine for determining valid and invalid events and a specific remediation routine for attempting to correct the problem without manual intervention, such that the same validation and remediation routines are called for every event within the same event class for consistent event processing; said invoked automated triage process comprises:
   (a) creating an event record to store results of the automated triage process;
   (b) automatically invoking the specific validation routine for that event class which provides for detection and validation of the event and updates the event record with validation routine results;
   (c) if the validation routine determines the event is invalid, dropping the event from the reception engine and ending the automated triage process; otherwise, automatically invoking the specific remediation routine for that event class to attempt to correct the problem;
   (d) re-invoking the validation routine for the event class which updates the event record with the validation routine results and, if the event is now invalid, dropping the event from the reception engine and ending the automated triage process;
   (e) if the event is still valid, passing the event back to the reception engine along with at least two new environmental variables for the event comprising a validation code variable based on the validation routine results and a triage path variable comprising a path to the validation routine results of the automated triage for use in the event dispatch process; and
   (f) ending the automated triage process.

2. The method of claim 1 wherein the validation routine tests the object and stores the validation result, updates a first environmental variable to designate a validation status, and updates a second environmental variable that contains a path to the validation result.

3. The method of claim 2 wherein step (b) further comprises invoking a default validation routine that stores a summary of the problem as a validation result and ends the automated triage process if no validation routine exists for the event class.

4. The method of claim 2, wherein the re-invoked validation routine re-tests the object and stores the validation result, and updates the first environmental variable to indicate the validation status.

5. The method of claim 2 wherein triage data comprises the first environmental variable indicating the validation status and the second environmental variable containing the path to the stored validation results.

6. The method of claim 5 wherein a network management program uses the triage data to create any required problem tickets or notifications for the event.

7. The method of claim 5 further comprising appending triage data to a problem ticket.

8. The method of claim 1 wherein the validation routine designates false positive events as invalid.

9. The method of claim 1 wherein the validation routine designates transient events as invalid.

10. The method of claim 1 wherein the validation routine designates predefined secondary events as invalid.

11. The method of claim 1 further comprising automatically dispatching a problem ticket at the end of the triage process only for valid events.

12. The method of claim 1 further comprising determining if the event is associated with an object in maintenance and, if in maintenance, ending the automated triage process.

13. The method of claim 1 wherein the validation routine designates as valid events those events that are not a transient system event, not a false positive event, or not a predefined secondary event.

14. The method of claim 1 wherein invoking the validation routine comprises dynamically loading a script dependent on the event class.

15. A system of managing events in a network to reduce operator intervention, when an event representative of a problem with an object in the network is received at a reception engine comprising:
   a network communication channel;
   at least one server having a reception engine connected to the network communication channel;
   a notification means for forwarding an event of a monitored object to the reception engine;

an automated triage process for receiving an event at reception engine representative of a problem with an object in the network comprising:

reading the event details of the event to determine an event class for the event;

prior to dispatching the event by the reception engine, invoking one of a plurality automated triage processes based on the event class for the event, wherein each automated triage process is based on an event class and comprises a specific validation routine for determining valid and invalid events and a specific remediation routine for attempting to correct the problem without manual intervention, such that the same validation and remediation routines are called for every event within the same event class for consistent event processing; said invoked automated triage process comprises:

(a) creating an event record to store results of the automated triage process;

(b) automatically invoking the specific validation routine for that event class which provides for detection and validation of the event and updates the event record with validation routine results;

(c) if the validation routine determines the event is invalid, dropping the event from the reception engine and ending the automated triage process; otherwise, automatically invoking the specific remediation routine for that event class to attempt to correct the problem;

(d) re-invoking the validation routine for the event class which updates the event record with the validation routine results and, if the event is now invalid, dropping the event from the reception engine and ending the automated triage process;

(e) if the event is still valid, passing the event back to the reception engine along with at least two new environmental variables for the event comprising a validation code variable based on the validation routine results and a triage path variable comprising a path to the validation routine results of the automated triage for use in the event dispatch process; and (f) ending the automated triage process.

16. A physical computer-readable storage medium for managing events in a network to reduce operator intervention when an event representative of a problem with an object in the network is received by a reception engine comprising computer-executable instructions embedded thereon for:

reading event details of an event received at a reception engine representative of a problem with an object in the network to determine an event class for the event;

prior to dispatching the event by the reception engine, invoking one of a plurality automated triage processes based on the event class for the event, wherein each automated triage process is based on an event class and comprises a specific validation routine for determining valid and invalid events and a specific remediation routine for attempting to correct the problem without manual intervention, such that the same validation and remediation routines are called for every event within the same event class for consistent event processing; said invoked automated triage process comprises computer-executable instructions for:

(a) creating an event record to store results of the automated triage process;

(b) automatically invoking the specific validation routine for that event class which provides for detection and validation of the event and updates the event record with validation routine results;

(c) if the validation routine determines the event is invalid, dropping the event from the reception engine and ending the automated triage process; otherwise, automatically invoking the specific remediation routine for that event class to attempt to correct the problem;

(d) re-invoking the validation routine for the event class which updates the event record with the validation routine results and, if the event is now invalid, dropping the event from the reception engine and ending the automated triage process;

(e) if the event is still valid, passing the event back to the reception engine along with at least two new environmental variables for the event comprising a validation code variable based on the validation routine results and a triage path variable comprising a path to the validation routine results of the automated triage for use in the event dispatch process; and (f) ending the automated triage process.

* * * * *